(12) United States Patent
Lawahmeh et al.

(10) Patent No.: US 7,352,583 B2
(45) Date of Patent: Apr. 1, 2008

(54) FLEXIBLE LEAD FOR A PRESSFIT DIODE BRIDGE

(75) Inventors: Ahmed Lawahmeh, Muncie, IN (US); Tom Merrill, Noblesville, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 188 days.

(21) Appl. No.: 11/242,544

(22) Filed: Oct. 3, 2005

(65) Prior Publication Data
US 2007/0075600 A1 Apr. 5, 2007

(51) Int. Cl.
*H05K 7/20* (2006.01)
(52) U.S. Cl. ........................... 361/704; 361/707
(58) Field of Classification Search ............ None
See application file for complete search history.

(56) References Cited

U.S. PATENT DOCUMENTS

| 2,763,822 | A | * | 9/1956 | Frola et al. ............... 257/763 |
| 2,861,226 | A | * | 11/1958 | Lootens ................... 257/708 |
| 3,229,757 | A | * | 1/1966 | Root et al. ............... 165/80.3 |
| 3,275,921 | A | * | 9/1966 | Fellendorf et al. ........ 363/141 |
| 3,894,225 | A | | 7/1975 | Chao |
| 5,019,438 | A | | 5/1991 | Rapisarda |
| 5,154,507 | A | | 10/1992 | Collins |
| 5,206,793 | A | * | 4/1993 | Boudrant et al. .......... 257/689 |
| 5,442,519 | A | | 8/1995 | DeBalko et al. |
| 5,521,124 | A | | 5/1996 | Tai |
| 5,912,804 | A | * | 6/1999 | Lawson et al. ........... 361/704 |
| 6,034,862 | A | | 3/2000 | Pelosi et al. |
| 6,400,104 | B1 | | 6/2002 | Ham |
| 6,659,632 | B2 | | 12/2003 | Chen |
| 6,707,691 | B2 | * | 3/2004 | Bradfield ................. 363/145 |
| 6,970,357 | B2 | * | 11/2005 | Hsieh ..................... 361/704 |

FOREIGN PATENT DOCUMENTS

| EP | 0 521 312 A1 | 1/1993 |
| EP | 0 856 940 A1 | 9/1997 |
| JP | 56085844 A | 7/1981 |
| JP | 63129654 A | 6/1988 |
| JP | 63222451 A | 9/1988 |
| JP | 09064270 A | 3/1997 |
| JP | 11330333 A | 11/1999 |

* cited by examiner

*Primary Examiner*—Boris Chervinsky
(74) *Attorney, Agent, or Firm*—Thomas A. Walsh; Ice Miller LLP

(57) ABSTRACT

An improvement to a bridge rectifier assembly of the type used to convert alternating current produced by an motor vehicle alternator into direct current. The bridge rectifier assembly of this type comprises a heat sink, a plurality of pressfit diodes installed in the heat sink, and a plurality of terminals electrically connected to the motor vehicle alternator. The first end of a flexible conductor is mechanically and electrically connected to a conductive connector. The second end of the flexible conductor is mechanically and electrically connected to a lead of one of the plurality of pressfit diodes. The conductive connector is electrically connected to one of the plurality of terminals to complete an electrical connection between the one of the plurality of pressfit diodes and the one of the plurality of terminals.

3 Claims, 4 Drawing Sheets

US 7,352,583 B2

FLEXIBLE LEAD FOR A PRESSFIT DIODE BRIDGE

BACKGROUND

The electrical system of a motor vehicle having an internal combustion engine typically comprises an alternator and a battery. The battery provides the direct current necessary to crank the motor vehicle's engine and to power the motor vehicle's electrical components (lights, radio, etc.) when the engine is not running. When the engine is running, the alternator generates electric current to power the motor vehicle's electrical components (lights, radio, etc.) and to recharge the battery.

A typical motor vehicle alternator generates three-phase alternating current that is converted into direct current using a rectifier. FIG. 1 shows a top view of rectifier assembly 10 of a type known in the art. Shown in FIG. 1 are heat sinks 12, insulator 14, and pressfit diodes 16. Insulator 14 comprises three lug terminals 18. Two crimp connectors 20 are electrically connected to each lug terminal 18. Each crimp connector 20 typically is constructed of a copper alloy.

Rectifier assembly 10 is assembled by installing pressfit diodes 16 into heat sinks 12, and installing insulator 14 between heat sinks 12. Each crimp connector 20 is electrically connected to a respective pressfit diode 16 by crimping and/or welding. FIG. 2 shows a side elevation view of a typical connection between a pressfit diode 16 and a crimp connector 20. Shown in FIG. 2 are pressfit diode 16 with diode lead 22 emerging therefrom. The distal end of diode lead 22 is crimped within crimp connector 20. Note that heat sinks 12 and insulator 14 are not shown in FIG. 2 to avoid cluttering the diagram.

Following assembly of rectifier assembly 10, a lead from a motor vehicle alternator (not shown) is connected to each lug terminal 18, thereby electrically connecting two pressfit diodes 16 to the motor vehicle alternator lead.

A primary disadvantage in a typical rectifier assembly arises from the rigid connection between crimp connector 20 and diode lead 22. Operation of a motor vehicle engine causes temperature cycling and vibration of the motor vehicle engine and its components, including the rectifier assembly. Such temperature cycling and vibration induces stress on the rectifier assembly, and on the crimp connectors and diode leads in particular, resulting in frequent failures of the crimp connectors or diode leads.

Accordingly, it is desired to provide a more reliable connection for a rectifier assembly diode. A desired connection will provide electrical characteristics similar to the rigid connection of the prior art, but will be less prone to failure in the presence of temperature cycling, vibration, and other environment factors experienced by a motor vehicle rectifier assembly.

SUMMARY

In an embodiment, the present invention comprises a rectifier assembly. The rectifier assembly according to the present invention comprises a heat sink and a diode installed in the heat sink. The diode has at least one lead. The rectifier assembly according to the present invention also comprises a flexible conductor having a first end and a second end. The first end is mechanically and electrically connected to a connector and the second end is mechanically and electrically connected to the at least one lead. In an aspect, the present invention further comprises an insulator installed adjacent to the diode. The insulator comprises a plurality of wings arranged in relation to the diode in a manner that enhances electrical insulation between the at least one lead and the heat sink. In another aspect, the heat sink, the diode, and the insulator form a cavity, and a non-conductive polymer material can be injected in the cavity.

In an embodiment, the present invention comprises an improvement to a bridge rectifier assembly of the type used to convert alternating current produced by a motor vehicle alternator into direct current. Such a bridge rectifier assembly comprises a heat sink, a plurality of pressfit diodes installed in the heat sink, and a plurality of terminals electrically connected to the motor vehicle alternator. The improvement comprises the use of a flexible conductor having a first end and a second end, the first end of the flexible conductor being mechanically and electrically connected to a conductive connector, the second end being mechanically and electrically connected to a lead of one of the plurality of pressfit diodes, the conductive connector being electrically connected to one of the plurality of terminals to complete an electrical connection between the one of the plurality of pressfit diodes and the one of the plurality of terminals. The improvement comprises the use of an insulator installed adjacent to at least one of the plurality of pressfit diodes. The insulator comprises a plurality of wings arranged in relation to at least one of the plurality of pressfit diodes in a manner that enhances electrical insulation between at least one of the plurality of pressfit diodes and the heat sink.

BRIEF DESCRIPTION OF THE DRAWINGS

The features and advantages of this invention, and the methods of obtaining them, will be more apparent and better understood by reference to the following descriptions of embodiments of the invention, taken in conjunction with the accompanying drawings, wherein.

DESCRIPTION

The present invention comprises a more reliable connection for an electrical or electronic component. A connection according to the present invention is less prone to failure in the presence of temperature cycling, vibration, and other environment factors.

Figure 1:
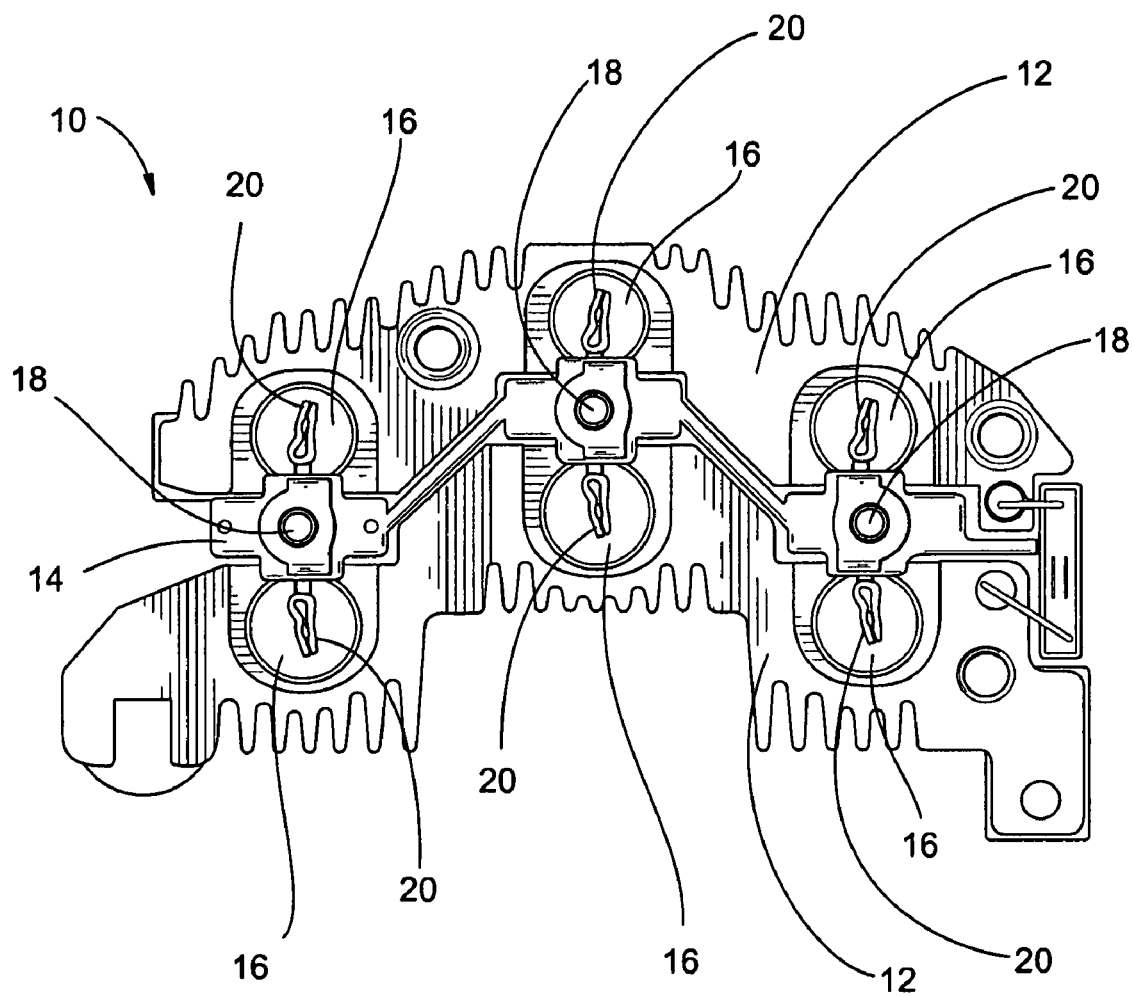
FIG. 1 shows a top view of rectifier assembly of a type known in the art.
Figure 2:
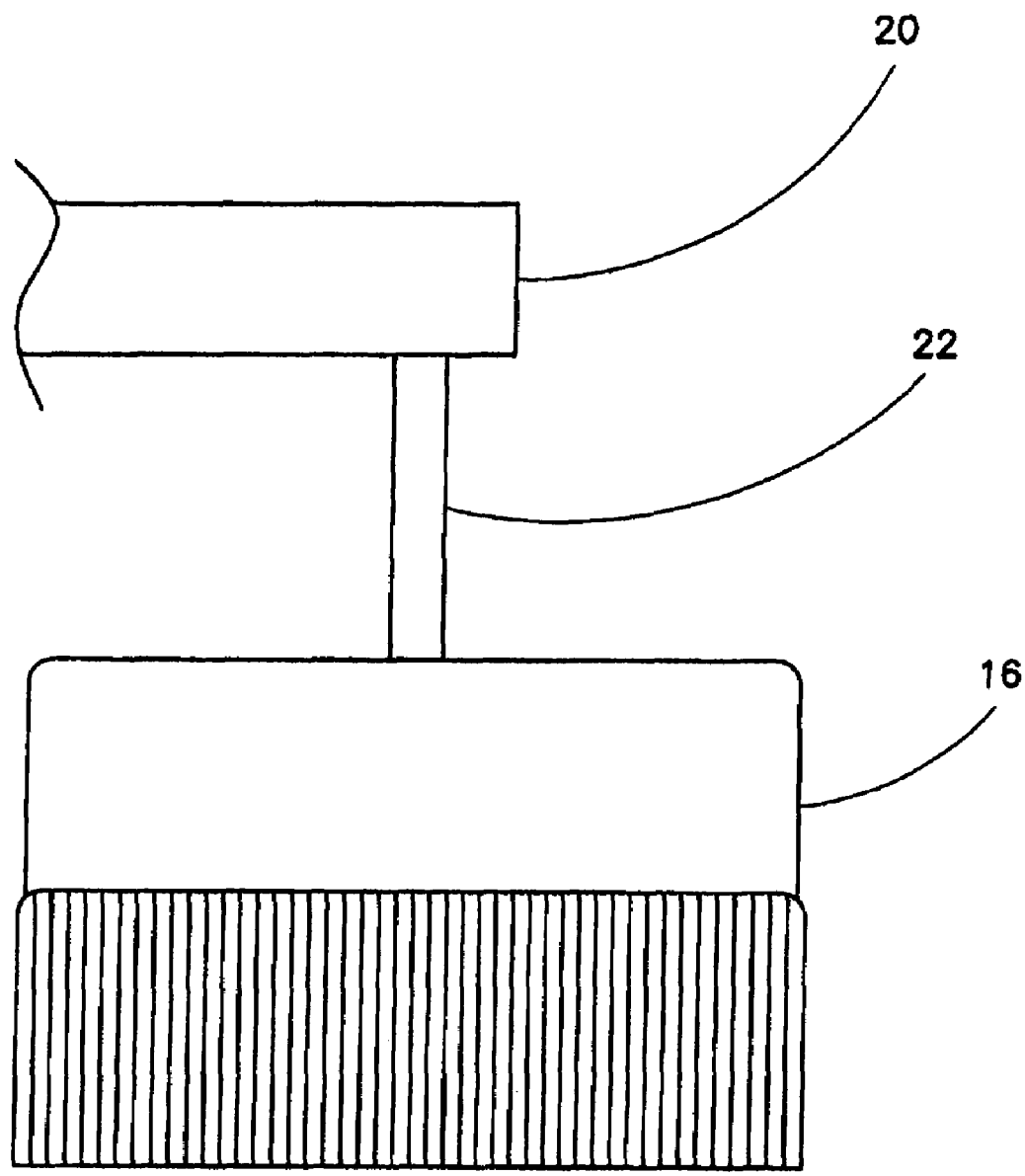
FIG. 2 shows a side elevation view of a typical connection between a pressfit diode and a crimp connector in a rectifier assembly of a type known in the art.
Figure 3:
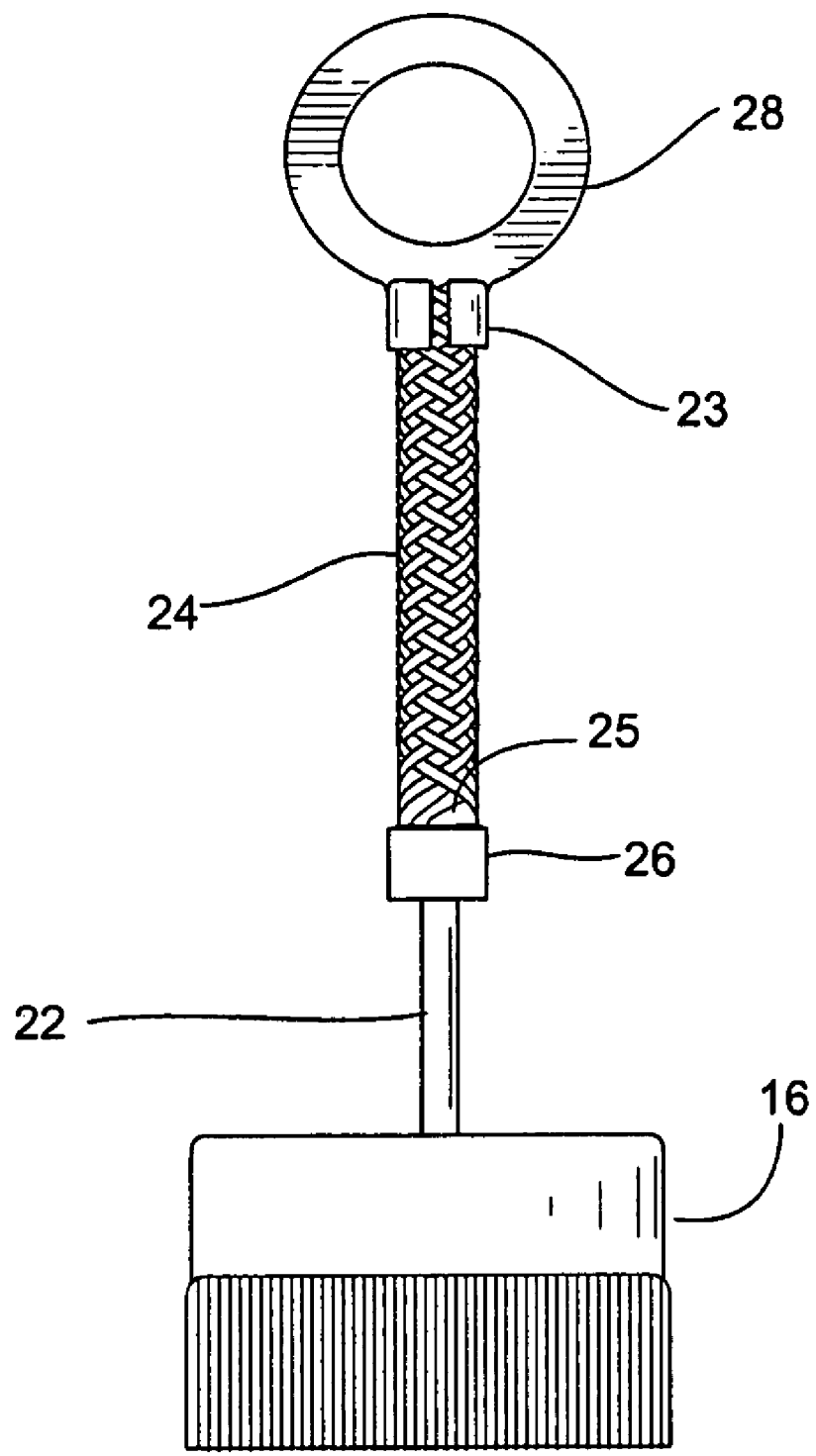
FIG. 3 shows a side elevation view of a diode and flexible connector according to an embodiment of the present invention.

FIG. 3 shows a side elevation view of a diode and flexible connector according to an embodiment of the present invention. Shown in FIG. 3 are pressfit diode 16, diode lead 22, and flexible conductor 24. In an embodiment, flexible conductor 24 comprises a pre-determined length of a flexible wire braid conductor having first end 23 and second end 25. First end 23 of flexible conductor 24 is mechanically and electrically connected with terminal 28, which is shown in FIG. 3 as a ring terminal, but may be a terminal of any shape. First end 23 of flexible conductor 24 is mechanically and electrically connected with terminal 28 by crimping, soldering, welding, and/or another technique known in the art for creating a mechanical and electrical connection between a wire braid conductor and a terminal.

Second end 25 of flexible conductor 24 is connected to lead 22. In the embodiment shown in FIG. 3, clip 26 encloses diode lead 22 and second end 25 of flexible conductor 24. Clip 26 is constructed of a crimpable conductive material such as, for example, a copper alloy. Second end 25 of flexible conductor 24 and diode lead 22 are mechanically and electrically connected within clip 26 by crimping, soldering, welding, and/or another technique known in the art for creating a mechanical and electrical connection between a wire braid conductor and a component lead.

Figure 4:
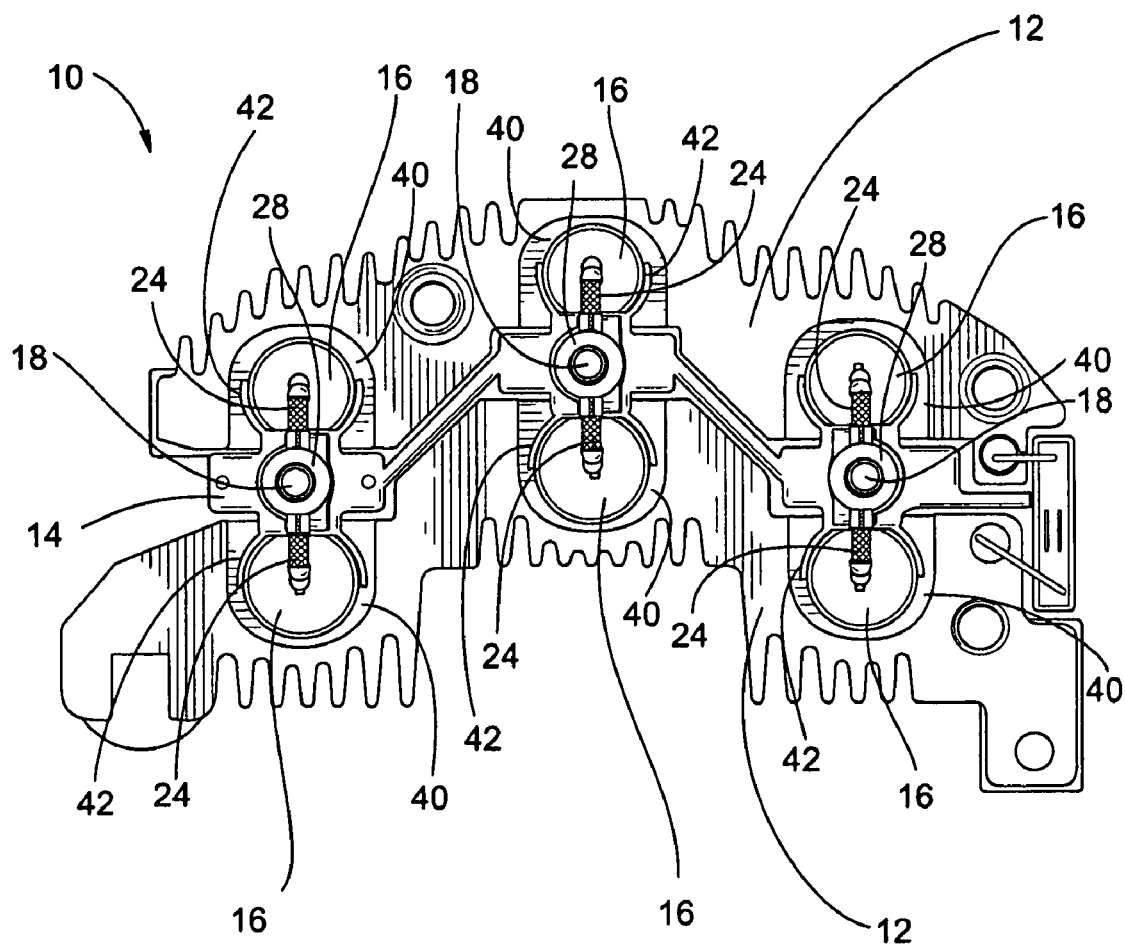
FIG. 4 shows a top view of a flexible connector according to an embodiment of the present invention deployed in a rectifier assembly.

FIG. 4 shows a top view of an embodiment of a flexible connector of the present invention deployed in rectifier assembly 10. Shown in FIG. 7 are heat sinks 12, insulator 14, and pressfit diodes 16. Insulator 14 comprises three lug terminals 18. Each pressfit diode 16 is mechanically and electrically connected to a flexible conductor 24. Each flexible conductor 24 is mechanically and electrically connected to a terminal 28. Rectifier assembly 10 is assembled by installing pressfit diodes 16 into heat sinks 12, and installing insulator 14 between heat sinks 12. Insulator 14 according to the present invention comprises a plurality of wings 42. A pair of wings 42 fits around and/or over each pressfit diode 16 to enhance electrical insulation between heat sinks 12 and lead 22, and between heat sinks 12 and flexible conductor 24. Each flexible conductor 24 is electrically connected to a respective lug terminal 18 by inserting the respective lug terminal 18 in the terminal 28 on flexible conductor 24. A lead from the motor vehicle alternator (not shown) then also is electrically connected to each lug terminal 18, thereby electrically connecting two pressfit diodes 16 to the motor vehicle alternator lead. In the embodiment shown in FIG. 4, the arrangement of heat sink 12, diode 16, and insulator 14 form a cavity 40. In the embodiment shown in FIG. 4, a non-conductive polymer (for example, a silicone material such as an RTV material) is installed in cavity 40 to provide additional mechanical support and vibration dampening.

While this invention has been described as having a preferred design, the present invention can be further modified within the scope and spirit of this disclosure. This application is therefore intended to cover any variations, uses, or adaptations of the invention using its general principles. For example, the methods disclosed herein and in the appended claims represent one possible sequence of performing the steps thereof. A practitioner of the present invention may determine in a particular implementation of the present invention that multiple steps of one or more of the disclosed methods may be combinable, or that a different sequence of steps may be employed to accomplish the same results. Each such implementation falls within the scope of the present invention as disclosed herein and in the appended claims. Furthermore, this application is intended to cover such departures from the present disclosure as come within known or customary practice in the art to which this invention pertains and which fall within the limits of the appended claims.

We claim:

1. A rectifier assembly comprising:
   a heat sink;
   a diode installed in said heat sink, said diode having at least one lead; and
   an insulator installed adjacent to said diode, said insulator comprising a plurality of wings arranged over said diode in a manner that enhances electrical insulation between said at least one lead and said heat sink.

2. The rectifier assembly of claim 1, wherein said heat sink, said diode, and said insulator form a cavity, the rectifier assembly further comprising:
   a non-conductive polymer material injected in said cavity.

3. In a bridge rectifier assembly of the type used to convert alternating current produced by a motor vehicle alternator into direct current, the bridge rectifier assembly comprising a heat sink, a plurality of pressfit diodes installed in the heat sink, and a plurality of terminals electrically connected to the motor vehicle alternator, an improvement comprising:
   a flexible conductor having a first end and a second end, said first end of said flexible conductor being mechanically and electrically connected to a conductive connector, said second end being mechanically and electrically connected to a lead of one of said plurality of pressfit diodes, said conductive connector being electrically connected to one of said plurality of terminals to complete an electrical connection between said one of said plurality of pressfit diodes and said one of said plurality of terminals; and
   an insulator installed adjacent to at least one of said plurality of pressfit diodes, said insulator comprising a plurality of wings arranged over said at least one of said plurality of pressfit diodes in a manner that enhances electrical insulation between said at least one of said plurality of pressfit diodes and said heat sink.

* * * * *